United States Patent Office 3,550,452
Patented Dec. 29, 1970

3,550,452
CHROMATOGRAPH INJECTION MEMBRANE MOUNT
István Halász, Kleebergstrasse 16, and Armin Kroneisen, Schmittener Strasse 21, both of 6 Frankfurt am Main, Germany
Filed Feb. 19, 1969, Ser. No. 800,665
Int. Cl. G01n *31/08*
U.S. Cl. 73—422    6 Claims

ABSTRACT OF THE DISCLOSURE

A mount for a sample injection membrane in a chromatographic instrument wherein the membrane is held between inner and outer clamping members, the outer member essentially having a small bore to guidingly receive a syringe needle. The outer piece is provided with a conical or inverted-cup shaped recess, as an enlargement of the bore, open toward the membrane to allow the latter to become distended thereinto.

BACKGROUND OF THE INVENTION (1) Field of the invention

Chromatograph serum cap mount.

(2) Description of the prior art

Sample charging devices are used in gas and liquid chromatography to insert a small amount of sample mixture to be analysed into a column to which is led a stream of carrier medium.

In the known sample charging devices the carrier medium flows near a membrane composed of elastic material held tightly between plane surfaces.

A cannula or hollow needle of an injection syringe is inserted through an exteriorly open bore in the device toward the membrane where the cannula may penetrate the membrane to inject the sample into the carrier medium. As long as the excess pressure of the carrier medium relative to the outside pressure is not very large the cannula can be withdrawn to carry out the injection several times without difficulties. But with increasing pressure of the carrier medium problems occur. To name one, a part of the sealing membrane is forced into the bore through which the syringe needle is guided from the exterior and the entrance and guiding of the needle is hindered with the consequence that leakage occurs at the place of penetration and the carrier medium leaks out of the system. Yet use of high pressures on the carrier medium is often necessary in order to obtain a sufficiently high flow-through speed in the column. The invention minimizes the named objections and enables the use of very high carrier medium pressures without the difficulties met with by repeated injections.

SUMMARY OF THE INVENTION

An outer covering or clamping piece for the membrane is provided with an inner recess coaxial with the guide bore for the cannula. The pressure of the carrier medium distends the membrane to a somewhat arched or dome shape with the dome entering the recess. It is especially advantageous if the diameter of the recess in the outer piece where the latter bears upon the membrane is from 2.0 to 2.5 times the thickness of the membrane. A favorable shape for the recess both for production and action is that of a cone whose axis coincides with that of the guide bore for the cannula. In such a case a cone angle, with respect to its axis, between 20° and 50° has been found satisfactory. Round cup-shaped and cylindrical recesses have been found to give good results.

Since the invention enables the use of very high carrier medium pressures great force must be exerted on the syringe for the insertion of the cannula. This necessitates and especially good guiding of the cannula over its entire length. This guiding is attained by use of a tube and a fixed location guide bore in the apparatus, the tube being axially slidable against spring pressure and essentially increasing the length of the bore guiding action. In this manner the cannula is guided during the entire penetrating movement.

DESCRIPTION OF THE PREFERRED EMBODIMENTS

Figure 1:
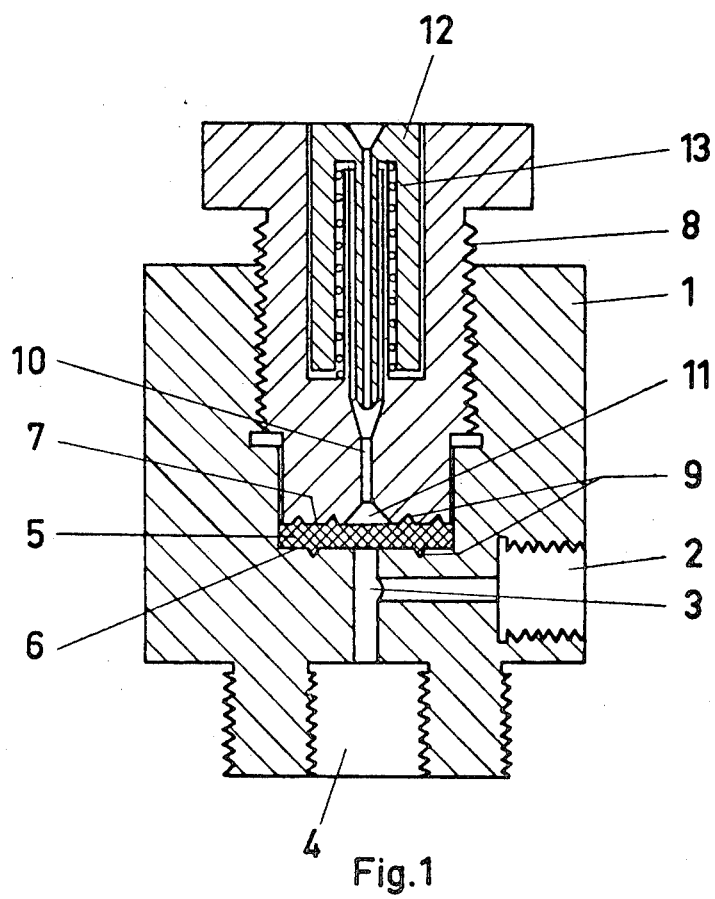
FIG. 1 shows the invention in longitudinal cross section.

The main body 1 of the sample acceptor device is shown in FIG. 1 as a square metal piece with a lower nipple for connection to the column of a chromatographic instrument. Carrier medium, for instance helium, enters through a lateral inlet opening 2 and, deflected by a right angular turn at 3, passes the column at lower outlet 4. Immediately above the turn 3 is an elastic membrane, for example a rubber pad 2 mm. in thickness, held tightly clamped between a lower surface 6 in the body 1 and an inner end surface 7 of a threaded plug 8 above and screwed into the body. Both surfaces 6 and 7 are provided with circular V grooves 9 into which the pad or membrane protrudes from the face of the latter to increase the tightness of the fit. The plug 8 is provided with an axial bore which has a somewhat greater diameter than that of the cannula and serves as a guide for the latter. In FIG. 1 the recess, coaxial with the bore, for receiving the puffed out membrane is shown as of conical shape at 11.

A slidably mounted guide tube 12 for the cannula is urged outwardly by a helical spring 13 around the tube 12 and compressed between plug and tube. FIG. 1 shows the tube in the pushed-in position as when it is pushed in by the syringe.

Figures 2, 3:
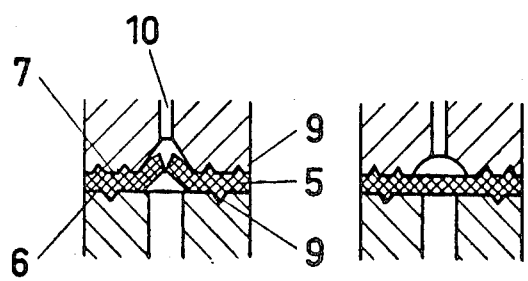
FIG. 2 shows the deformation of the membrane due to excess pressure of the carrier medium.
FIG. 3 shows the invention provided with a recess of modified shape.

FIG. 2 shows the rubber pad deformed by excess pressure in the interior of the receiving device. The pad is strained by the two sealing or tightening surfaces 6 and 7 as well as by the action of the excess pressure. Owing to this, the passageway resulting from penetration by the cannula automatically becomes closed.

Satisfactory operation of the invention can be explained in the following manner. By the arching of the pad into the recess the massive pressure on the inner edge or rim of the passageway raises it appreciably and causes the rim to grip the needle tightly. In addition, the repeated penetration of the cannula is facilitated by the crater shape of the passageway.

It has been found the invention is satisfactory when carrier-medium pressure is as high as 300 atmospheres and repeated penetration by the injection nozzle is possible at those high pressures. The known upper limit of pressure may be only a practical limit since there are no injection nozzles on the market that can stand pressures exceeding 300 atm.

The lower cross sectional circle of the cone 11 which bears on the elastic membrane 5 preferably has a diameter of 2 to 2.5 times the thickness of the membrane. Accordingly for a membrane thickness of 2 mm. the base of the cone is from 4 to 5 mm. in diameter. A cone angle relative to the axis of the guiding bore from 20° to 50° gave satisfactory results. A 30° angle is preferred.

In FIG. 3 the recess is domed or inverted cup-shape rather than conical as in FIG. 1. The membrane is in this state when no super atmospheric pressure prevails.

The invention claimed is the following:

1. In a chromatographic instrument having a mount for a membrane to be penetrated by a syringe for injecting fluid into a flowing carrier medium, said mount comprising a block having inlet and outlet passageways for the carrier medium, the block being provided with a counter bore in communication with one of said passageways and providing a ledge seat for the membrane, a plug in said counter bore having an inner end engaging on the membrane and holding the latter fluid-tight on the seat, said plug having a fine bore for guiding a hollow needle from the exterior toward the membrane for penetration of the latter, the inner end of the plug being provided with a round recess in communication with the fine bore and of greater diameter at the end of the plug than the fine bore, into which recess a portion of the membrane may become arched under pressure of the carrier medium said recess being of substantially conical shape and flaring toward the membrane and coaxial with the fine bore.

2. In an instrument as claimed in claim 1, the cone angle of said recess being between 20° and 50° relative to the axis thereof.

3. In an instrument as claimed in claim 2 the cone angle being about 30°.

4. In an instrument as claimed in claim 2, the diameter of said recess at the membrane being from 2.0 to 2.5 times the thickness of the membrane.

5. In a chromatographic instrument having a mount for a membrane to be penetrated by a syringe for injecting fluid into a flowing carrier medium, said mount comprising a block having inlet and outlet passageways for the carrier medium, the block being provided with a counter bore in communication with one of said passageways and providing a ledge seat for the membrane, a plug in said counter bore having an inner end engaging on the membrane and holding the latter fluid-tight on the seat, said plug having a fine bore for guiding a hollow needle from the exterior toward the membrane for penetration of the latter, the inner end of the plug being provided with a round recess in communication with the fine bore and of greater diameter at the end of the plug than the fine bore, into which recess a portion of the membrane may become arched under pressure of the carrier medium, said recess being cup-shaped and opening toward the membrane.

6. In an instrument as claimed in claim 5 said recess having a diameter where the plug engages on the membrane of from 2.0 to 2.5 times the thickness of the membrane.

References Cited

UNITED STATES PATENTS

| | | | |
|---|---|---|---|
| 3,000,218 | 9/1961 | Marks et al. | 73—23.1X |
| 3,247,704 | 4/1966 | Konig | 73—23.1 |
| 3,374,660 | 3/1968 | McKinney et al. | 73—422(GC)X |
| 3,431,783 | 3/1969 | Radgens | 73—422(GC) |

LOUIS R. PRINCE, Primary Examiner

H. C. POST III, Assistant Examiner